United States Patent
Neet

(10) Patent No.: US 11,025,117 B2
(45) Date of Patent: Jun. 1, 2021

(54) DISTRIBUTED STATOR WINDING HAVING PARALLEL PATHS WITH CROSSING END LOOPS

(71) Applicant: BorgWarner Inc., Auburn Hills, MI (US)

(72) Inventor: Kirk Neet, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 73 days.

(21) Appl. No.: 16/259,513

(22) Filed: Jan. 28, 2019

(65) Prior Publication Data

US 2020/0244125 A1 Jul. 30, 2020

(51) Int. Cl.
*H02K 3/12* (2006.01)
*H02K 3/28* (2006.01)

(52) U.S. Cl.
CPC ............. *H02K 3/12* (2013.01); *H02K 3/28* (2013.01)

(58) Field of Classification Search
CPC .................................. H02K 3/12; H02K 3/28
USPC .................. 310/179, 180, 201, 203, 207
See application file for complete search history.

(56) References Cited

U.S. PATENT DOCUMENTS

| | | | |
|---|---|---|---|
| 2,015,562 A | 9/1935 | Kilgore | |
| 7,075,206 B1* | 7/2006 | Chen | H02K 3/28 310/179 |
| 7,348,705 B2 | 3/2008 | Cai et al. | |
| 8,716,910 B2 | 5/2014 | Edrington | |
| 8,760,019 B2* | 6/2014 | Mori | B60L 50/15 310/71 |
| 9,455,605 B2* | 9/2016 | Saito | B60L 58/10 |
| 9,467,010 B2 | 10/2016 | Stephenson et al. | |
| 9,866,083 B2* | 1/2018 | Tamura | H02K 3/28 |
| 9,979,242 B2 | 5/2018 | Neet et al. | |
| 10,110,078 B2 | 10/2018 | Neet | |
| 2004/0108783 A1 | 6/2004 | Kruse | |
| 2018/0034335 A1 | 2/2018 | Neet et al. | |
| 2018/0097431 A1 | 4/2018 | Laldin et al. | |

FOREIGN PATENT DOCUMENTS

KR  1020010076216 A  8/2001

OTHER PUBLICATIONS

International Search Report and Written Opinion in related case PCT/US2020/14949, dated May 21, 2020.

* cited by examiner

*Primary Examiner* — Burton S Mullins
(74) *Attorney, Agent, or Firm* — Maginot, Moore & Beck LLP

(57) ABSTRACT

An electric machine includes a stator core having a plurality of slots formed therein and a winding positioned in the slots of the stator core. The winding includes eight parallel paths distributed in layers of the stator core. The eight parallel paths include four pairs of adjacent paths. A first pair of adjacent paths crisscrosses a second pair of adjacent paths in the layers of the stator core. A third pair of adjacent paths crisscrosses a fourth pair of adjacent paths in the layers of the stator core. Neither the first pair nor the second pair of adjacent paths crisscrosses one or both of the third pair and the fourth pair of adjacent paths in the layers of the stator core.

17 Claims, 7 Drawing Sheets

DISTRIBUTED STATOR WINDING HAVING PARALLEL PATHS WITH CROSSING END LOOPS

FIELD

This application relates to the field of electric machines, and more particularly, winding arrangements for electric machines.

BACKGROUND

Electric machines are designed to meet specific operating requirements depending on the intended application the electric machine. Depending on the specific design of the electric machine, the machine will have various performance characteristics. Examples of design features that contribute to operating performance include stator size, rotor size, torque output, efficiency, type and arrangement of the of windings, number of stator slots, number of poles, slots per pole per phase, number of conductors per slot, number of parallel paths per phase, number of turns, and any of various other design parameters as will be recognized by those of ordinary skill in the art.

It would be desirable to provide an electric machine with a distributed winding arrangement having improved power, efficiency and cooling ability. It would also be advantageous for such a winding arrangement to provide an improved sinusoidal waveform for a stator that reduces harmonic emf and reduces torque ripple in the machine. It would be advantageous if such a winding arrangement could be utilized in various power applications, such as various electric and/or hybrid-electric vehicle applications, including generally light duty applications with lower voltage requirements for the electric machine. It would be of further advantage if such winding arrangement could be provided such that the electric machine may be easily manufactured, thus reducing manufacturing costs. While it would be desirable to provide an electric machine that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY

In accordance with at least one embodiment of the disclosure, an electric machine comprises a stator core having a plurality of slots formed therein and a winding positioned in the slots of the stator core. The winding includes eight parallel paths distributed in layers of the stator core. The eight parallel paths include four pairs of adjacent paths. A first pair of adjacent paths crisscrosses a second pair of adjacent paths in the layers of the stator core. A third pair of adjacent paths crisscrosses a fourth pair of adjacent paths in the layers of the stator core. Neither the first pair nor the second pair of adjacent paths crisscrosses one or both of the third pair and the fourth pair of adjacent paths in the layers of the stator core.

In at least one embodiment of the disclosure, a stator for an electric machine comprises a stator core having a plurality of slots formed therein and at least one stator winding positioned in the plurality of slots. The at least one stator winding includes at least four parallel paths, each parallel path including in-slot conductors positioned in multiple layers in the slots and end turns extending between the in-slot conductors. A first parallel path crisscrosses a second parallel path in a first set of layers of the stator core. A third parallel path crisscrosses a fourth parallel path in a second set of layers of the stator core. The first and second parallel paths and the third and fourth parallel paths respectively transition to a third set and a fourth set of layers of the stator core without either of the first and second parallel paths crisscrossing one or both of the third and fourth parallel paths.

In at least one additional embodiment of the disclosure a stator for an electric machine comprises a stator core having a plurality of slots formed therein and a winding positioned in the slots of the stator core, the winding including eight parallel paths distributed in layers of the stator core. Each parallel path includes in-slot conductors positioned in multiple layers in the slots and end turns extending between the in-slot conductors. The eight parallel paths include four pairs of adjacent paths. The end turns include (i) standard end turns that connect in-slot conductors of adjacent paths in the same layers without swapping the positions of in-slot conductors, (ii) swap end turns that connect in-slot conductors of adjacent paths in the same layers and swap the positions of the in-slot conductors, (iii) crisscross end turns that move first adjacent paths from a first layer to a second layer and moves second adjacent paths from the second layer to the first layer, and (iv) transition end turns that move adjacent paths from a third layer to a fourth layer without crisscrossing other end turns.

The above described features and advantages, as well as others, will become more readily apparent to those of ordinary skill in the art by reference to the following detailed description and accompanying drawings. While it would be desirable to provide an electric machine with a stator winding arrangement that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
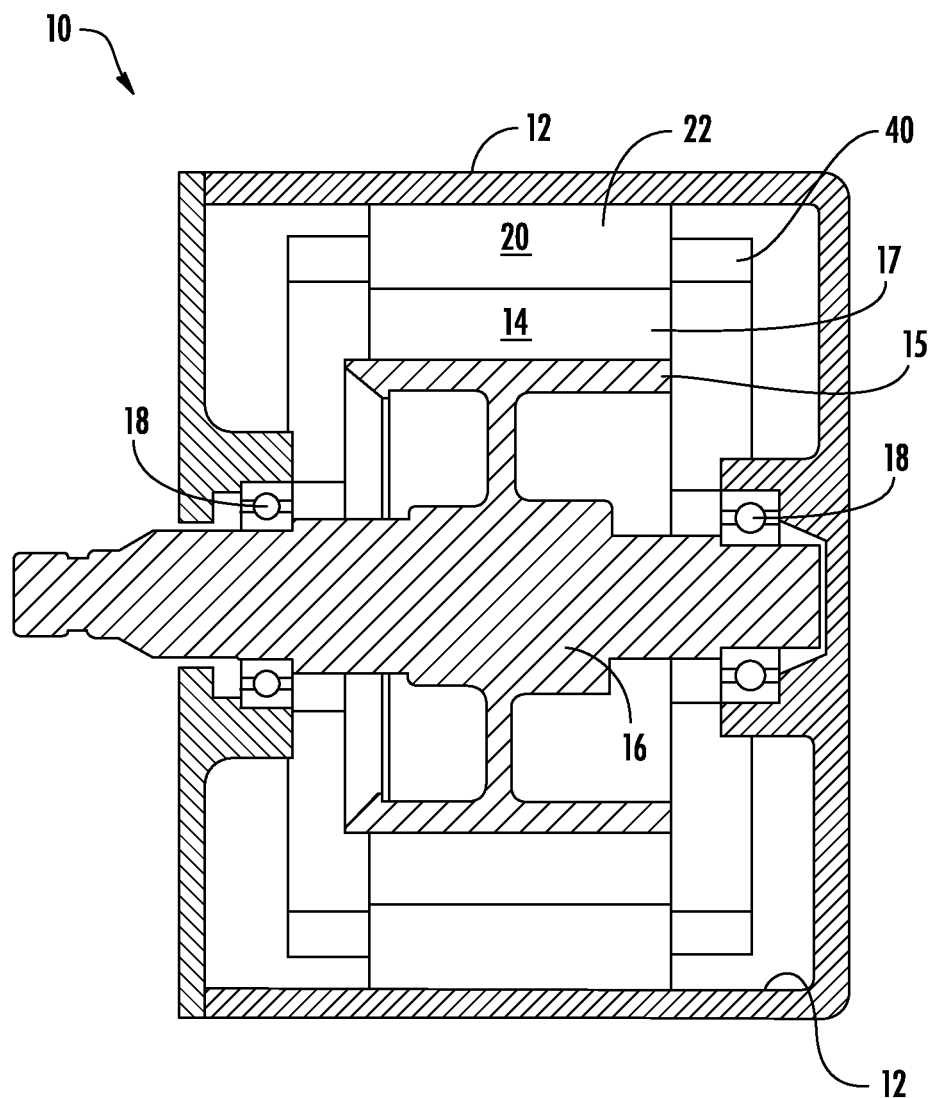
FIG. 1 shows a cross-sectional view of an electric machine including a stator with a distributed winding having crossing end loops.

With reference to FIGS. 1-3b, an electric machine 10 includes a housing 12 with a stator assembly 20 and a rotor assembly 14 positioned within the housing 12. The stator assembly 20 includes a stator core 22 with a winding arrangement 40 positioned on the stator core 22. As disclosed herein, the winding arrangement is a distributed winding arrangement that includes multiple parallel paths per phase and multiple end cross loops of different pitches extending between different sets of wires or other conductors positioned in the slots.

The rotor assembly 14 is positioned inside of the stator core 22 and is mounted on a shaft 16. The shaft 16 is rotatably supported by bearings 18. The shaft 16, in turn, supports the rotor assembly 14. The rotor assembly 14 includes a rotor hub 15 that is fixed relative to the shaft 16, and a rotor lamination 17 that is fixedly secured to the rotor hub 15 and configured to rotate relative to stator 20. In at least one embodiment, permanent magnets (not shown) are mounted on the rotor lamination 17. In at least one alternative embodiment, electrical windings (not shown) are included on the rotor lamination 17. The rotor 14 and shaft 16 are configured to rotate within the electrical machine 10 while the stator assembly 20 remains stationary.

The stator assembly 20 includes both the stator core 22 and the winding arrangement 40. The stator core 22 is comprised of a ferromagnetic material and is typically formed from a plurality of steel sheets that are stamped and stacked upon one another to form a lamination stack. The stator core 22 is generally cylindrical in shape as defined by a center axis 24, and includes an inner perimeter surface 26 and an outer perimeter surface 28. A plurality of teeth 31 are formed on the interior of the stator core 22 between the inner perimeter surface 26 and the outer perimeter surface 28. Each tooth extends radially inward and terminates at the inner perimeter surface 26. Axial slots 30 (which may also be referred to herein as "slot segments") are formed in the stator core 22 between the teeth 31.

Figure 2:
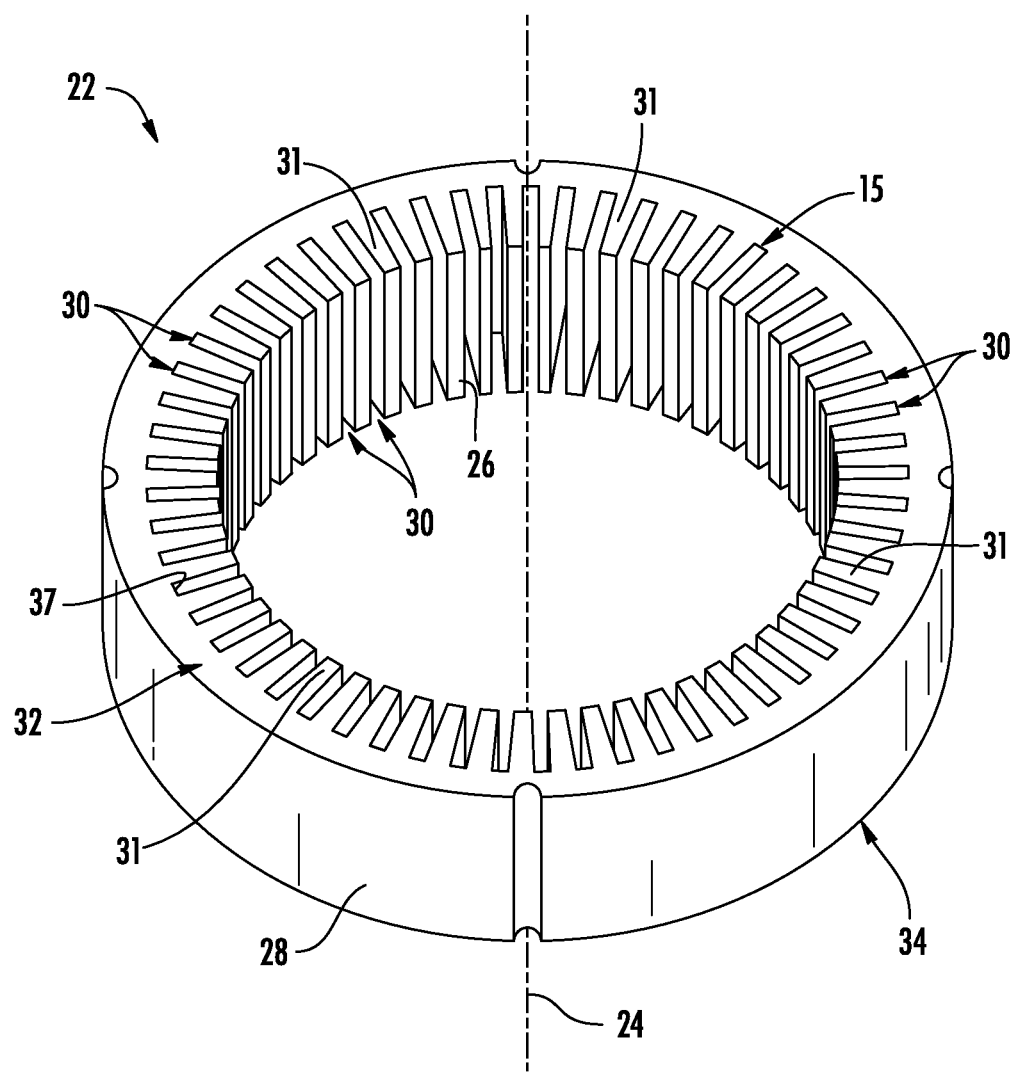
FIG. 2 shows a perspective view of a stator core of the electric machine of FIG. 1.

Depending on the configuration of the teeth 31, the slots 30 may be open along the inner perimeter surface 26 of the stator core 16, as shown in FIG. 2, or may be semi-closed slots with each slot 28 having a smaller width near the inner perimeter surface 26 than the width closer to the outer perimeter surface 28. Openings to the slots 30 are provided through the inner perimeter surface 26 as well as the ends 32 and 34 of the stator core 22. As described in further detail below, each slot is defined by opposing radial walls and wires or other conductors are retained within the slots.

The stator core 22 is configured to retain the winding arrangement 40 within the slots 30 of the stator core 22. In at least one embodiment, the winding arrangement 40 is formed from a plurality of elongated wires (e.g., copper wires) that are continuously wound within the slots 30 on the stator core 22 in order to form the windings. In at least one alternative embodiment, the winding arrangement 40 is formed from a plurality of segmented conductors 42. The segmented conductors 42 are inserted into the slots 30 from a first end 32 (i.e., the "insertion end") of the stator core 34. The segmented conductors 42 are connected together at an opposite end 22 of the stator core 16 (i.e., the "weld end"). An example of segmented conductors 42 that may be used to form the winding arrangement is shown in U.S. Pat. No. 7,622,843, the contents of which are incorporated herein by reference.

Figure 3A:
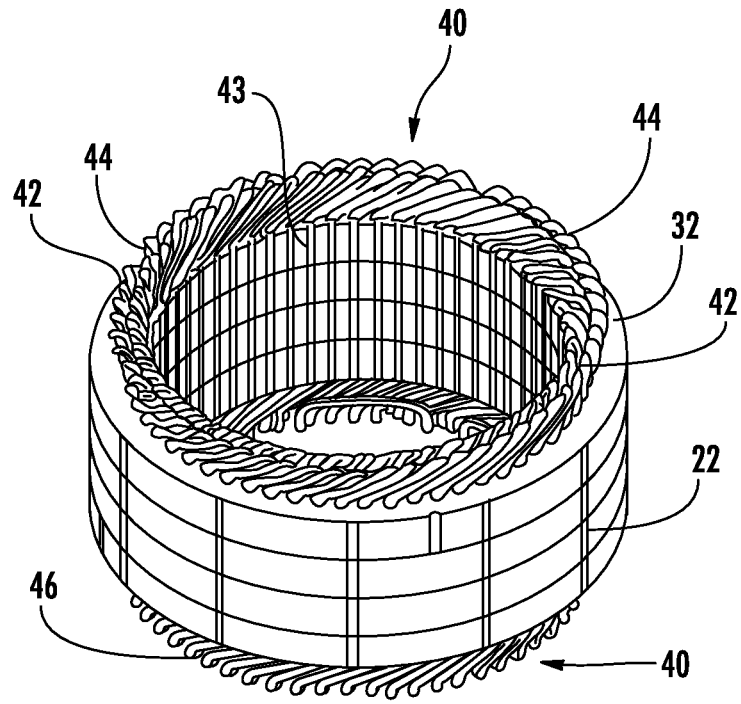
FIG. 3A shows a perspective end-turn view of the stator core of FIG. 2 with windings arranged on the stator core.

FIG. 3a shows the insertion end 32 of the stator 20 with a plurality of segmented conductors 42 positioned in the slots of the stator core 22. Each of the segmented conductors 42 includes a first in-slot/axial portion 43 (or "first leg") positioned in one slot, a second axial portion (or "second leg") positioned in another slot, and an end loop portion (which may also be referred to as an "end-turn" or "U-turn" portion) extending between the first axial portion and the second axial portion on the insertion end 32 of the stator 20. The U-turn portions 44 are clearly visible on the insertion end of 32 of the stator in FIG. 3a. Each U-turn portion 44 extends over a number of slots on the insertion end 32 of the stator 20, and this number of slots (plus 1) defines an end loop pitch for the associated coil that is formed the segmented conductor 42. For example, if a U-turn portion 44 extends over 5 slots (slot #1 to slot #7), then the end loops is defined has a 6 pitch end loop. The segmented conductors 42 are not all identical, as some conductors are defined by different end loop pitches, and/or may provided leads or other connections within the winding arrangement 40.

Figure 3B:
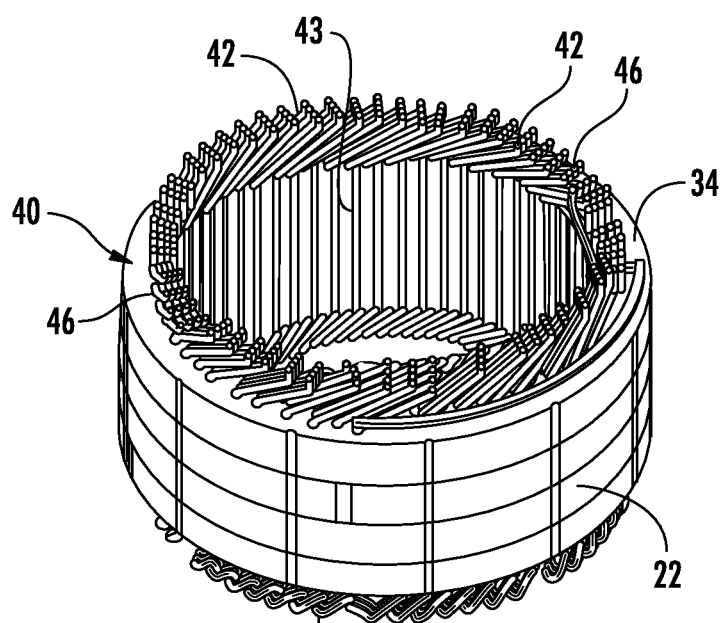
FIG. 3B shows a perspective connection-end view of the stator core of FIG. 3A.

FIG. 3b shows the weld end 34 of the stator 20. As noted previously, the weld end is the opposite side of the stator from the insertion end 32. The leg ends 46 of the segmented conductors are clearly visible on the weld end 34 of the stator. Adjacent leg ends 46 are welded or otherwise joined together to complete electrical paths within the stator. In other words, when the leg ends of multiple segmented conductors are joined together, various windings are formed on the stator core 22. In at least one embodiment, the windings are three phase stator windings with multiple paths for each phase, as explained in further detail below.

Figure 4A:
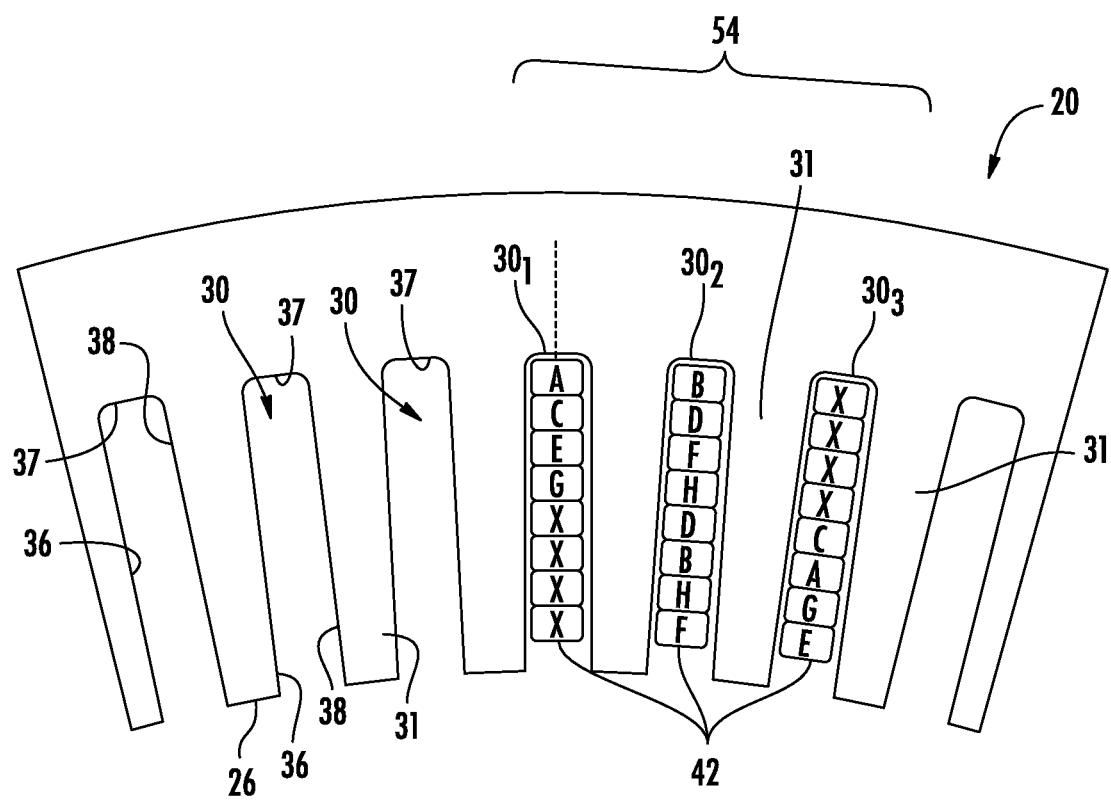
FIG. 4A shows a cross-sectional view of a portion of the stator of FIG. 1 with conductors of eight parallel paths of one phase positioned in a three-slot set of the stator core.

FIG. 4A shows an enlarged cross-sectional view of a number of the slots 30 of the stator core 22. For purposes of illustration, some of the slots are empty, and other slots include segmented conductors 42 positioned therein. The slots 30 are formed between the teeth 31. Accordingly, each slot 30 is defined by a first wall portion 36 associated with one tooth, and an opposing second wall portion 38 associated with an adjacent tooth. The first wall portion 36 and the second wall portion 38 of each slot 30 are separated by a back wall portion 37 which establishes a slot width. Both the first wall portion 36 and the second wall portion 38 extend radially inward from the back wall portion 37 to the inner perimeter surface 26 of the stator core 22. The first wall portion 36, second wall portion 38 and back wall portion 37 all extend axially from the insertion end 32 to the weld end 34 of the stator core. Accordingly, each slot provides a passage through the stator core 22 that extends from the insertion end 32 to the weld end 34 of the core. The width of each slot is sufficient in size to receive at least one conductor of the winding arrangement. Additionally, the depth of each slot is configured to receive multiple conductors of the winding arrangement 40. While the slots 30 are shown completely open at the inner perimeter surface 26 in FIG. 4A, it will be recognized that in at least some embodiments the slots may be partially closed or completely closed slots.

The winding arrangement 40 in the embodiment disclosed herein is formed by inserting conductors 42 into each of the slots of the stator core 22. In the embodiment disclosed herein, the conductors 42 are arranged in a single file in each slot 30, and eight conductors are positioned in each slot (i.e., in layers 1-8). For simplicity, FIG. 4A shows the conductors 42 for only a single phase winding 50 of the complete winding arrangement 40 (e.g., one of phase U, phase V, or phase W). Each phase of the winding arrangement 40 includes eight conductors (A-H) which are arranged in a 4-8-4 pattern of conductors 42 in the slots 30. Each 4-8-4 pattern is associated with a pole for the winding arrangement 40. The number of slots 30 that are associated with a pole for a particular phase of the winding arrangement 40 may be referred to herein as a "slot set" 54. In the embodiment of FIG. 4A, each slot set 54 is a three-slot set with four conductors in a first slot $30_1$ (i.e., the "left" slot) of the slot set, eight conductors in a second slot $30_2$ (i.e., the "middle" slot) of the slot set, and four conductors in a third slot $30_3$ (i.e., the "right" slot) of the slot set. The slots in each slot set 54 are all adjacent with the left slot $30_1$ adjacent to the middle slot $30_2$, and the middle slot $30_2$ adjacent to the right slot 302.

Each three-slot set carries eight parallel paths of conductors (A-H) for a single phase of the winding arrangement 40. Thus, as shown in FIG. 4A, each of the conductors labeled "A," "B," "C," "D," "E," "F," "G," and "H" represents a conductor associated with one of the eight parallel paths for a single phase of the windings (i.e., in the drawings, each of the conductors 42 labeled A-H represents one of the parallel paths for a single winding phase; the conductors A-H do not represent different phases of the winding arrangement). A complete parallel path for the winding is formed by connecting the conductors 42 in the various slots via the end-turn portions and connections.

In each three-slot set 54, two conductors for each of the eight parallel paths are positioned in one or two of the slots 42. For example, in slot set 54 of FIG. 4A, parallel path A includes a first conductor (labeled "A") in layer one of the left slot $30_1$, and a second conductor (also labeled "A") in layer six of right slot $30_3$; there is no path A conductor in the middle slot $30_2$. As another example, in slot set 54 of FIG. 4A, parallel path B includes a first conductor (labeled "B") in layer one of the middle slot $30_2$, and a second conductor (also labeled "B") in layer six of the middle slot $30_2$; there are no path B conductors in the left slot $30_1$ or the right slot $30_3$. The conductors labeled "X" in the left slot $30_1$ and the right slot $30_3$ are conductors associated with another phase winding. Accordingly, it will be appreciated that the slot sets 54 overlap slots between phases in the 4-8-4 arrangement of FIG. 4A.

Figure 5:
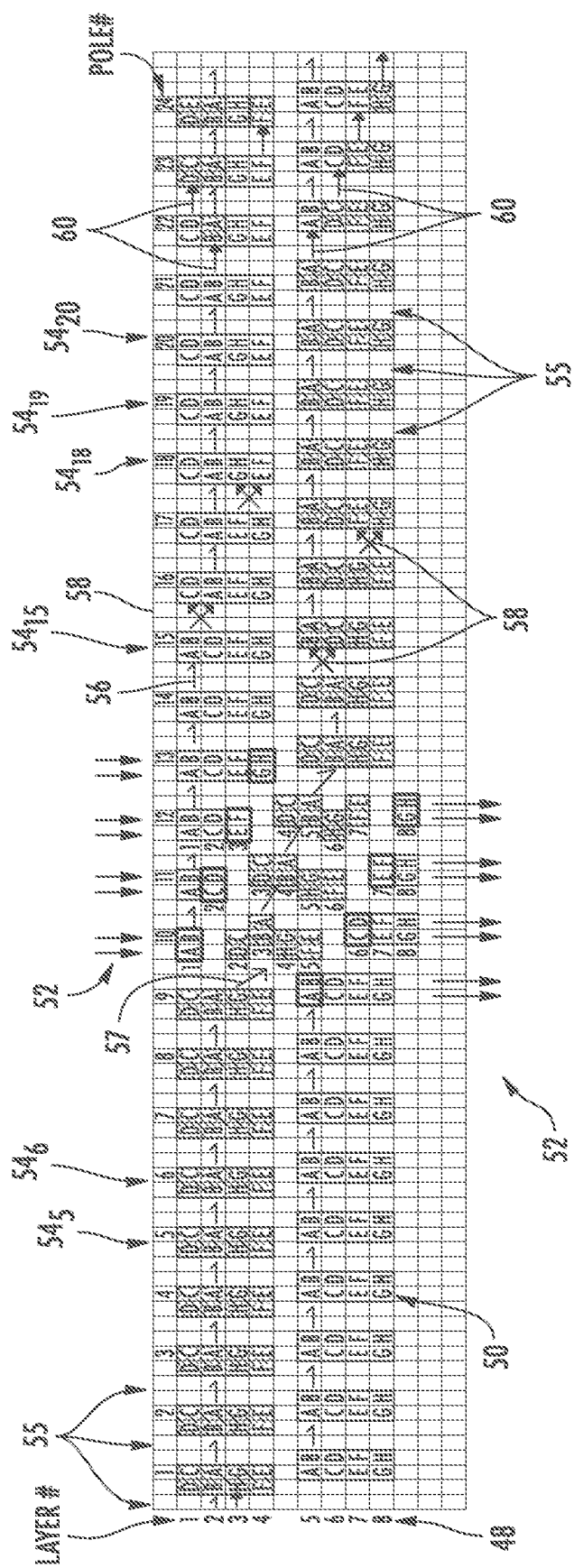
FIG. 5 shows a slot graph of a stator winding for the electric machine of FIG. 1, the slot graph showing the position of each of parallel paths A-H and associated end loop connections that form two clockwise revolutions of the stator winding for each parallel path.

It will be appreciated that FIG. 4A shows only one slot set 54 for the winding 50, and the full winding includes each of paths A-H arranged in multiple slot-sets of the stator core such that each parallel path weaves around the stator core in order to complete multiple revolutions of the stator core (e.g., two revolutions as shown in FIG. 5, below). Accordingly, each path includes in-slot portions 43 (as shown in FIG. 4A) and end turns 44 that connect that the in-slot portions in order to form wave-windings around the core. An example of a wave winding arrangement is disclosed in U.S. patent application Ser. No. 16/258,270, filed Jan. 25, 2019 and entitled "Electric Machine With Distributed Winding Having Double Cross End Loops," the entire contents of which are incorporated herein by reference.

Figure 4B:
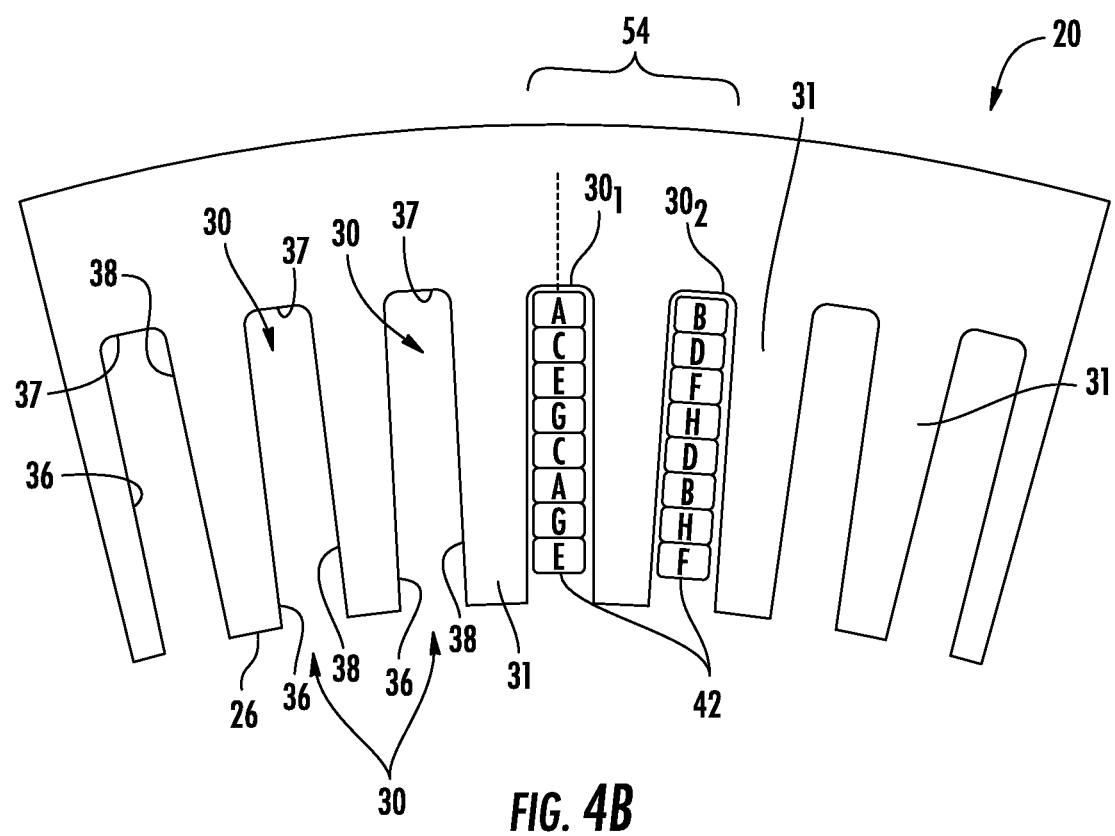
FIG. 4B shows a cross-sectional view of a portion of the stator of FIG. 1 with conductors of eight parallel paths of one phase positioned in a two-slot set of the stator core.

FIG. 4B shows an arrangement of the slot sets 54 in an alternative winding arrangement 40. In FIG. 4B, each phase of the winding arrangement 40 also includes eight conductors (A-H), but the conductors are arranged in an 8-8 pattern of conductors 42 in two-slot sets (i.e., the eight conductors associated with each pole of the winding arrangement 40 are positioned in two adjacent slots). While FIGS. 4A and 4B only show two embodiments for slot sets 54 for the winding arrangement 40, it will be recognized that other slot sets with differently configured parallel paths are also possible.

With reference now to FIG. 5, a slot graph for one phase of a full winding arrangement 40 is shown, the winding arrangement including three-slot sets, such as those of FIG. 4A. The slot graph of FIG. 5 illustrates the slots 30 for each pole/slot set 54 of the winding arrangement (i.e., slot sets $54_1$-$54_{24}$) and the conductors for the paths (A-H) that are arranged in the layers 48 of each slot (i.e., which of layers 1-8 retain which path for each slot). The letters "A," "B," "C," "D," "E," "F," "G," and "H" in FIG. 5 represent the position of the path within a given slot, and the arrows represent sets of end loops extending between adjacent slot sets for the phase (i.e., adjacent slot sets $54_1$-$54_{24}$). It will be recognized that each of slot sets $54_1$-$54_{24}$ includes two adjacent slot sets (i.e., a left slot set and a right slot set on either side of a given slot set). While the stator core 22 is shown as linear in FIG. 5 for the sake of convenience, it will be appreciated that the stator core 22 is actually annular, and therefore slots sets $54_1$ and $54_{24}$ are also adjacent slot sets.

As shown in FIG. 5, each three-slot set 54 of the winding arrangement 40 includes conductors arranged in a 4-8-4 configuration. In other words, each slot set 54 includes four conductors in four of the eight layers of the left slot, eight conductors in the eight layers of the middle slot, and four conductors in four of the eight layers of the right slot. For the sake of simplicity, FIG. 5 only shows the slot sets 54 for a single phase of the winding arrangement. While the spaces 55 between each adjacent slot set in FIG. 5 are only the size of a single slot, it will be appreciated that each space 55 actually represents three slots which accommodate the slot sets in which the other phase windings of the winding arrangement 40 are located. Because of the 4-8-4 configuration of the conductors for each phase, it will be appreciated that the slot sets 54 for different phases of the winding arrangement overlap. For example, the left slot of a phase U slot set may be the right slot of a phase W slot (i.e., there may be four phase U conductors and four phase W in a single slot).

With continued reference to FIG. 5, it will be recognized that the winding arrangement 40 includes sets of parallel paths that are always positioned in the same layer of the slot sets. For example, paths A and B are always in the same layer of a given slot set. Thus, in slot set $54_{19}$ of FIG. 5 paths A and B are shown in the left and middle slots of layer 2 and are also shown in the middle and right slots of layer 5. Similarly, in slot set $54_{14}$ paths A and B are shown in the left and middle slots of layer 1 and are also shown in the middle and right slots of layer 6. Parallel paths A and B are referred to herein as a pair of "adjacent paths" (e.g., "adjacent paths A-B," or "adjacent paths A and B") because each instance of an "A" in a layer of a slot 30 includes an instance of "B" in the same layer of an adjacent slot. Each pair of parallel paths C-D, E-F, and G-H, respectively, are also adjacent paths.

FIG. 5 includes a series of arrows, including arrows to illustrate the end-turn connections for between the in-slot portions of adjacent paths A and B. The arrows include arrows 56 that represent standard end turns, arrow 57 that represents special pitch transitional end turns, arrows 58 that represent crisscross end turns, and arrows 60 that represent swap end turns. By following the arrows it can be seen that parallel paths A and B each make two clockwise revolutions around the core 22. For the sake of simplicity, arrows have not been used to show the revolutions of adjacent paths C and D, E and F, and G and H around the core, but it will be recognized by those of ordinary skill in the art that each of these parallel paths also completes two revolutions around the stator core. The term "revolution" as used refers to a wrap of the conductors substantially around and through the slots of the stator core even if the winding does not completely encircle the stator core a full 360° (e.g., a parallel path that wraps 345° around the stator core is considered to makes a revolution of the stator core even though it may not completely encircle the stator core a full 360° for some reason, such the parallel path ending in leads).

Leads 52 are represented by arrows in FIG. 5 leading into and out of the winding arrangement 40. The first set of eight leads 52 is provided on a first end of the stator core (i.e., either the insertion end or the weld end), and allows the eight parallel paths of the winding 50 to enter the stator core 22 at four different three-set slots 54 (i.e., slot sets 54$_{10}$-54$_{13}$). Adjacent paths A-B enter the stator core as a lead 52 at layer 1 of slot set 54$_{10}$ (as represented by the box around paths A-B in layer 1 of slot set 54$_{10}$). Similarly, adjacent paths C-D enter the stator core as a lead 52 at layer 2 of slot set 54$_{11}$ (as represented by the box around paths C-D), adjacent paths E-F enter the stator core as a lead 52 at layer 3 of slot set 54$_{12}$ (as represented by the box around paths E-F), and adjacent paths G-H enter the stator core as a lead 52 at layer 4 of slot set 54$_{13}$ (as represented by the box around paths G-H). After entering the first three-slot set at layer 1, each pair of adjacent paths proceeds to successive slot sets as shown in FIG. 5. The leads 52 of adjacent paths AB and CD and EF and GH enter the stator core in 4 adjacent (for this phase) slot sets.

An exemplary winding progression will now be described with reference to adjacent paths A-B. After entering the stator core at layer 1 of slot set 54$_{10}$, adjacent paths A-B progress to successive slot sets 54 in a wave-like manner, remaining in layer one of the winding 50 until reaching slot set 54$_{15}$. End loops having a pitch of six are used to join the in-slot portions of the conductors between adjacent slot sets.

Between slot sets 54$_{15}$ and 54$_{16}$, adjacent paths A-B transition to layer 2 (it will be noted by the crisscrossing arrows 58 that adjacent paths A-B crisscross with adjacent paths C-D at this location). Thereafter, adjacent paths A-B progress to successive slot sets, remaining in layer 2 of the winding 50 until reaching slot set 54$_{21}$. Again, end loops having a pitch of six are used to join the in-slot portions of the conductors between adjacent slot sets.

Between slot sets 54$_{21}$ and 54$_{22}$, adjacent paths A-B cross such that the slot position changes (i.e., from A-B to B-A. but they remain the same pair of adjacent paths). In particular, the A path moves from the left slot to the middle slot, and the B path moves from the middle slot to the left slot. Special end loops having pitches of seven and five are used to accomplish this transition (i.e., the A path uses a seven pitch end loop to extend one additional slot, and the B path uses a five pitch end loop to extend one less slot). Thereafter, adjacent paths B-A progress to successive slot sets, remaining in layer 2 of the winding 50 until reaching slot set 54$_9$.

Between slot sets 54$_9$ and 54$_{13}$, the adjacent paths B-A move from layer 2 to layer 6. Between slot sets 54$_9$ and 54$_{10}$, adjacent paths B-A transition to layer 3. Also, these endturns are special seven pitch end turns that shift the adjacent paths B-A to the right, thus resulting in the 4-8-4 conductor arrangement for the slot-sets 54. Between slot sets 54$_{10}$ and 54$_{11}$, adjacent paths B-A transition to layer 4, returning again to the standard six pitch end turn between slot sets. Between slot sets 54$_{11}$ and 54$_{12}$, adjacent paths B-A transition to layer 5. Between slot sets 54$_{12}$ and 54$_{13}$, adjacent paths B-A transition to layer 6. Thereafter, adjacent paths B-A progress to adjacent slot set 54$_{14}$.

Between slot sets 54$_{14}$ and 54$_{15}$, adjacent paths B-A transition to layer 5. Thereafter, adjacent paths A-B progress to successive slot sets, remaining in layer 5 of the winding 50 until reaching slot set 54$_{21}$. It will be noted by the crisscrossing arrows 58 that adjacent paths A-B crisscross with adjacent paths C-D at this location.

Between slot sets 54$_{21}$ and 54$_{22}$, adjacent paths B-A cross such that the slot position changes (i.e., from B-A back to A-B). In particular, the B path moves from the middle slot to the left slot, and the A path moves from the right slot to the middle slot. Special end loops having pitches of seven and five are used to accomplish this transition (i.e., the B path uses a seven pitch end loop to extend one additional slot, and the A path uses a five pitch end loop to extend one less slot). Thereafter, adjacent paths A-B progress to successive slot sets, remaining in layer 5 of the winding 50 until reaching slot set 54$_9$.

At slot set 54$_9$, the A-B path is connected to a second set of eight leads 52. The second set of leads 52 is provided on the first end of the stator core and allows the eight parallel paths of the winding 50 to exit the stator core 22 at four different three-set slots 54 (i.e., slot sets 54$_9$-54$_{12}$). Adjacent paths A-B exit the stator core at layer 5 of slot set 54$_9$, adjacent paths C-D exit the stator core at layer 6 of slot set 54$_{10}$ (as represented by the box around paths C-D), adjacent paths E-F enter the stator core at layer 3 of slot set 54$_{11}$ (as represented by the box around paths E-F), and adjacent paths G-H enter the stator core at layer 4 of slot set 54$_{12}$ (as represented by the box around paths G-H).

As noted previously, while not described in detail herein, the remaining parallel paths of the winding 50, including adjacent paths C-D, E-F and G-H, progress around the stator core in a similar manner to that described above in association with adjacent paths A-B. One minor difference is the outer leads 52 of path C-D are located in layer 2 of slot set 54$_{11}$, the outer leads 52 of path E-F are located in layer 3 of slot set 54$_{12}$ and the outer leads 52 of path G-H are located in layer 4 of slot set 54$_{13}$. Accordingly, inner leads 52 of path C-D are located in layer 6, inner leads 52 of path E-F are located in layer 7 and inner leads 52 of path G-H are located in layer 8.

As will be recognized from the foregoing description and the various indicia of FIG. 5, the disclosed winding 50 is characterized by a number of features. First, the winding is a two turn winding with eight parallel paths. Next, as noted by the crisscrossing arrows 58, crisscross end turns are used at four different locations in the winding in order to switch the layers in which adjacent paths are located. For example, crisscross end turns are used to crisscross adjacent paths A-B and C-D between slot sets 54$_{15}$ and 54$_{16}$. As a result, adjacent paths A-B transition from layer 1 to layer 2 of the winding, and adjacent paths C-D transition from layer 2 to layer 1 of the winding. This causes the conductors for adjacent paths A-B to be in layer 1 from pole 54$_{10}$ to pole 54$_{15}$ and then in layer 2 from pole 54$_{15}$ to pole 54$_9$, and vice-versa for the conductors of adjacent paths C-D. Similarly about 2 poles later (i.e., between poles 54$_{17}$ and 54$_{18}$) the conductors for adjacent paths E-F and G-H complete the same crisscross but the layers are 3 and 4. As also noted by the arrows 58, in layers 5 and 6, adjacent paths A-B crisscross adjacent paths C-D between slot sets 54$_{14}$ and 54$_{15}$, and in layers 7 and 8, adjacent paths E-F crisscross adjacent paths G-H between slot sets 54$_{16}$ and 54$_{17}$. These crisscrossing end turns balance the conductors in the slots, resulting in each path having similar positions in the depth (i.e., layers) of the stator slot over the entire winding.

While the crisscrossing end turns help balance the conductor paths in the winding, they do not over-complicate the manufacturing process. For example, adjacent paths E-F and G-H are never in layers 1 and 2, and adjacent paths A-B and C-D are never in layers 7 and 8. At the same time, adjacent paths A-B and C-D are only in layers 3 and 4 when they spiral inward in the transition area between poles 54$_9$ and 54$_{12}$. Similarly, adjacent paths E-F and G-H are only in layers 5 and 6 when they spiral inward in the transition area between poles 54$_9$ and 54$_{13}$. The winding is a unique configuration wherein adjacent paths A-B crisscross with adjacent paths C-D and adjacent paths E-F crisscross with adjacent paths G-H, but some of the conductors never crisscross other conductors (e.g., adjacent paths A-B and C-D never crisscross adjacent paths E-F and G-H, and vice-versa). As noted above, the winding 50 also includes special 7 pitch end turns in the area where the adjacent parallel paths A-B and C-D transition from layers 1 and 2 to layers 5 and 6 and the adjacent parallel paths E-F and G-H transition from layers 3 and 4 to layers 7 and 8. These special 7-pitch end turns cause the 4-8-4 pattern in the conductors of each slot set/pole. This is an advantageous arrangement that reduces torque ripple in the electric machine. In FIG. 5, for ease of showing the transition between layers, the layers in the transition region at poles $54_{10}$ through $54_{12}$ are shown as offset from the layers of other poles; however, it will be recognized that the conductors in each of these poles are also arranged in eight layers and the numerals to the left of the slot sets show the actual layer numbers for the associated conductors in this transition region.

For most of the slot sets 54, such as $54_{18}$, the slot pattern 4-8-4 is distributed in a common layer pattern with the 4 conductors located in the left slots housed in the 4 outer most layers, layer 1-4, and the 4 conductors located in the right slot are housed in the 5 inner layers, layers 5-8. However, special layer patterns exist for slot sets $54_{10}$, $54_{11}$ and $54_{12}$. For the slot set $54_{10}$, the special layer pattern consists of the four conductors A, D, H, F located in the left slot housed in layers 1,2,4,5 and the four conductors A, D, F, H located in the right slot housed in layers 3,6,7,8. For the slot set $54_{11}$, the special layer pattern consists of the four conductors A, C, H, F located in the left slot housed in layers 1,2,5,6 and the four conductors A, C, H, F located in the right slot housed in layers 3,4,7,8. For the slot set $54_{12}$, the special layer pattern consists of the four conductors A, C, E, H located in the left slot housed in layers 1,2,3,6 and the four conductors A, C, E, H located in the right slot housed in layers 4,5,7,8. As can be seen, the slot patterns for all of the slot sets are the same, 4-8-4, but the layer pattern for three of the slot sets $54_{10}$, $54_{11}$, $54_{12}$ is different than the layer pattern for the rest of the slot sets 54.

In addition to the above, the winding arrangement also includes special end turns that cause the conductors of the adjacent paths to flip-flop/swap left and right positions (which end turns may be referred to herein as "swap end turns"). The swap end turns are represented by arrows 60 in FIG. 5 and have a 5/7 pitch, the five pitch end turns resulting in the right-side conductors for pair of adjacent paths to be moved to the left-side conductors in subsequent slot sets, and the seven pitch end turns resulting the left-side conductors for the pair of adjacent paths to be moved to the right-side conductors in subsequent slot sets. For example between poles $54_{21}$ and $54_{22}$, the conductors in the A and B paths swap positions from A-B to B-A.

As shown in FIG. 5, there are four consecutive swap end turns (having 5-7 pitches), as noted by arrows 60 between consecutive slot sets $54_{21}$-$54_1$. Adjacent paths A-B swap positions between poles $54_{21}$ and $54_{22}$, adjacent paths C-D swap positions between poles $54_{22}$ and $54_{23}$, adjacent paths E-F swap positions between poles $54_{23}$ and $54_{24}$, and adjacent paths G-H swap positions between poles $54_{24}$ and $54_1$. By the adjacent paths swapping positions, the conductors are balanced between the left and right slots of the winding arrangement. For example conductor A is in the left slot (i.e., left of conductor B) the same number of times as wire B (relative to A). Also the same is true for the conductors for the other adjacent paths C-D, E-F and G-H. The same is true for the middle slot, resulting in a balanced arrangement of the conductors in the slots. It should also be noted that because the conductors for adjacent paths A-B, C-D, E-F and G-H start sequentially in layers 1, 2, 3, 4 for poles $54_{10}$, $54_{11}$, $54_{12}$ and $54_{13}$, and then get flipped by the crisscross end turns (see arrows 58), the arrows 60 for the swap end turns are not sequential between poles $54_{21}$ and $54_{24}$. In other words, the arrows 60 are not sequential between slot sets $54_{21}$ and $54_{24}$ starting with layer 1 and ending with layer 4, and instead occur in the sequence of layers 2, 1, 4, 3 between slot sets $54_{21}$ and $54_{24}$ because of the previous crisscrossing between layers for sets of adjacent paths. However, in layers 5-8, the sets of adjacent paths have again been crisscrossed in slot sets $54_{15}$ and $54_{17}$, as a result, the arrows 60 for the swap end turns are sequential between poles $54_{21}$ and $54_{24}$ in association with layers 5-8.

As a result of the swap end turns 60 and the crisscross end turns 58, as provided above, a winding arrangement is provided wherein the some of the paths crisscross, and other paths do not crisscross. For example, paths A and B crisscross (e.g., between slot sets $54_{21}$ and $54_{22}$), paths H and G crisscross (e.g., between slot sets $54_{24}$ and 541), but neither path A nor path B crisscross with either of path H or path G within the winding 50. Additionally, the winding transitions from an outer set of layers to an inner set of layers without the paths crisscrossing during the transition. For example, in the exemplary winding of FIG. 5, a first parallel path (e.g., path A) crisscrosses a second parallel path (e.g., path C) in a first set of layers of the stator core (i.e., layers 1 and 2), a third parallel path (e.g., path E) crisscrosses a fourth parallel path (e.g., path G) in a second set of layers of the stator core (i.e., layers 3 and 4), and the first and second parallel paths and the third and fourth parallel paths respectively transition in a transition region to a third set of layers (i.e., layers 5 and 6), and a fourth set of layers (i.e., layers 7 and 8) without either of the first and second parallel paths crisscrossing one or both of the third and fourth parallel paths (i.e., none of the parallel paths cross in the transition from slot set $54_9$ to $54_{13}$). The special end turns in this region further allow for the slot sets to be configured in a 4-8-4 layer arrangement for each winding phase.

The winding arrangement 40 disclosed herein includes a winding 50 with a relatively low number of turns (i.e., two), a relatively high number of parallel paths (i.e., eight), and two or three slots per pole per phase. Because of this the winding 50 is uniquely configured for operation with relatively low voltage (e.g., 48V) electric machines and related applications (e.g., light duty automotive). While the winding 50 disclosed herein is for a single phase of a three phase winding arrangement, the remaining two phases are identical, but positioned in different slot sets. Accordingly, the slot sets of the second and third phases are shifted from the slot sets of the first phase disclosed herein.

It will be appreciated that the winding arrangement disclosed herein may be implemented in an electric machine in any of various configurations and for any of various applications. For example, the windings may be provided by segmented conductors that are inserted into the slots and connected together or continuous conductors that are wound on the slots. As another example, the electric machine incorporating the winding arrangement may be used in an electric drive motor, a generator, or a combination alternator/generator.

Figure 6:
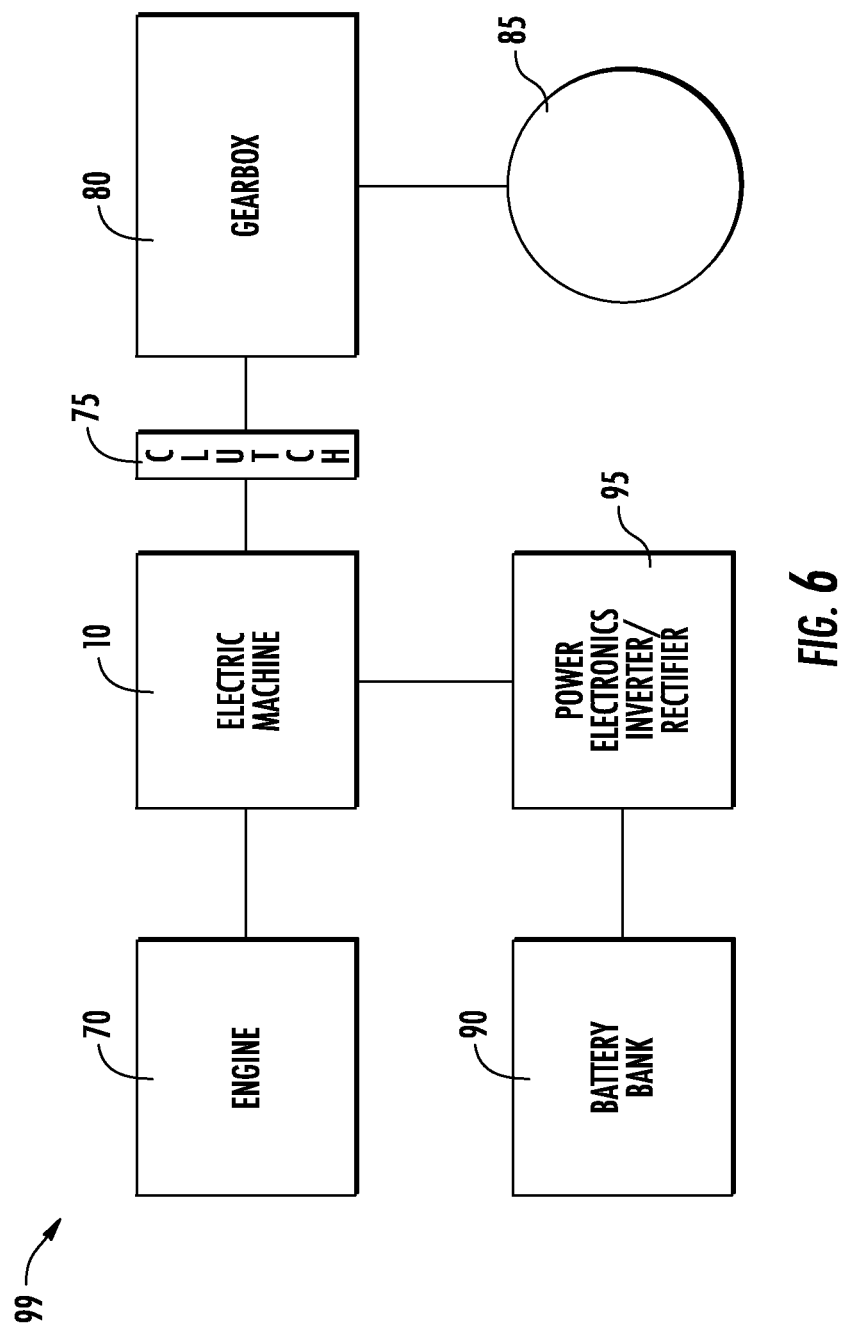
FIG. 6 shows the electric machine of FIG. 1 positioned in a vehicle.

With reference to FIG. 6, in at least one embodiment, the electric machine 10 with a winding having parallel paths with crossing end loops is provided as part of a hybrid electric drive system 99, such as the drive system for a hybrid electric vehicle. The hybrid electric drive system 99 comprises the electric machine 10 which is operably connected to the drive shaft of an internal combustion engine 70. The electric machine 10 is also operably connected to a gearbox 80 through a torque converter or clutch 75. The gearbox is operable to drive the wheels 85 of the hybrid electric vehicle. In addition, the electric machine 10 is operably connected to a battery bank 90 through a power electronics inverter/rectifier 95. The power electronics inverter/rectifier 95 is operable to deliver electric power to the electric machine or absorb electric power from the batteries.

During operation of the hybrid electric vehicle, the electric machine acts as both a motor and a generator. Motoring operations include starter motor operation and vehicle drive operation. First, the electric machine 10 operates as an electric starting motor that cranks internal combustion engine 70. During this time of engine cranking, the clutch 75 disengages the gearbox 80 from the electric machine. During low speed vehicle drive operations, the clutch 75 connects the electric machine 10 and the gearbox 80, allowing the electric machine to act as the propulsion drive, turning the wheels 85 of the vehicle. The electric machine 10 may also act as a propulsion assist for the vehicle during vehicle acceleration. During high speed vehicle driving, the electric machine 10 is driven by the internal combustion engine 70 and operates as an alternator, providing electric power for onboard electric loads and charging the battery bank. Finally, during vehicle braking and deceleration, the electric machine 10 acts as a re-generator which converts kinetic energy from the vehicle to electric power for charging the battery bank 90.

The foregoing detailed description of one or more embodiments of the stator winding connection arrangement has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

Various embodiments are presented in the drawings and in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

What is claimed is:

1. A stator for an electric machine comprising:
   a stator core having a plurality of slots formed therein; and
   a winding positioned in the slots of the stator core, the winding including eight parallel paths distributed in layers of the stator core, the eight parallel paths including four pairs of adjacent paths, wherein a first pair of adjacent paths crisscrosses a second pair of adjacent paths in the layers of the stator core, a third pair of adjacent paths crisscrosses a fourth pair of adjacent paths in the layers of the stator core, and neither the first pair nor the second pair of adjacent paths crisscrosses one or both of the third pair and the fourth pair of adjacent paths in the layers of the stator core, and
   wherein each of the four pairs of adjacent paths includes left-side conductors and right-side conductors in the slots, swap end loops that cause the left-side conductors and the right-side conductors to swap positions in the stator slots, and transitional end loops that cause each of the adjacent paths to move from one of four outer layers of the slots to one of four inner layers of the slots.

2. The stator of claim 1 wherein the eight parallel paths are distributed in the layers of the stator core for at least two revolutions around the stator core.

3. The stator of claim 1 wherein the winding is a single phase of a multi-phase winding arrangement, wherein the eight parallel paths of the winding are positioned in slot sets on the stator.

4. The stator of claim 3 wherein each of the slot sets includes a left slot, a middle slot, and a right slot, wherein four conductors of the winding are positioned in the left slot, eight conductors of the winding are positioned in the middle slot, and four conductors of the winding are positioned in the right slot.

5. The stator of claim 1 wherein the winding comprises end loops extending between conductors in each slot set, each of the end loops defined by an end loop pitch, the end loops including five-pitch end loops, six-pitch end loops, and seven pitch end loops.

6. A stator for an electric machine comprising:
   a stator core having a plurality of slots formed therein;
   at least one stator winding positioned in the plurality of slots, the at least one stator winding including at least four parallel adjacent paths each parallel adjacent path including in-slot conductors positioned in adjacent layers in the slots and end turns extending between the in-slot conductors, wherein a first parallel adjacent path crisscrosses a second parallel adjacent path in a first set of layers of the stator core, a third parallel adjacent path crisscrosses a fourth parallel adjacent path in a second set of layers of the stator core, and wherein the first and second parallel adjacent paths and the third and fourth parallel adjacent paths transition to a third set and fourth set of layers of the stator core.

7. The stator of claim 6 wherein the first parallel adjacent path does not crisscross the third parallel adjacent path in the first and second set of layers.

8. The stator of claim 6 wherein the first parallel adjacent path does not crisscross the third parallel adjacent path in the third and fourth set of layers.

9. The stator of claim 6 wherein a first set of crisscross end turns cause the first parallel adjacent path to crisscross the second parallel adjacent path, and a second set of crisscross conductors cause the third parallel adjacent path to crisscross the fourth parallel adjacent path.

10. The stator of claim 9 wherein the eight parallel adjacent paths are configured as four pairs of adjacent paths, wherein each adjacent path includes left-side in-slot conductors, right-side in-slot conductors, and swap end loops that cause the left-side conductors and the right-side conductors to swap positions in the slots.

11. The stator of claim 10 further comprising transitional end loops that cause each of the adjacent paths to move from the first and second set of layers of the slots to the third and fourth set of layers of the slots.

12. The stator of claim 11 wherein the winding is a single phase of a multi-phase winding arrangement, wherein the eight parallel adjacent paths of the winding are positioned in slot sets on the stator.

13. The stator of claim 12 wherein the slot sets are three slot sets, each slot set including a left slot, a middle slot, and a right slot, wherein four conductors of the winding are positioned in the left slot, eight conductors of the winding are positioned in the middle slot, and four conductors of the winding are positioned in the right slot.

14. The stator of claim 6 wherein each adjacent parallel path includes two leads that enter the stator core slots and the two leads of the four adjacent parallel paths enter the stator core slots in four adjacent slot sets.

15. The stator of claim 14 wherein the two leads of the four adjacent parallel paths enter the stator core in four different layers.

16. The stator of claim 6 wherein the four adjacent parallel paths fill the slots sets in a first layer pattern and a second layer pattern.

17. A stator for an electric machine comprising:
a stator core having a plurality of slots formed therein;
a winding positioned in the slots of the stator core, the winding including eight parallel paths distributed in layers of the stator core, each parallel path including in-slot conductors positioned in multiple layers in the slots and end turns extending between the in-slot conductors, the eight parallel paths including four pairs of adjacent paths, the end turns including (i) standard end turns that connect in-slot conductors of adjacent paths in the same layers without swapping the positions of in-slot conductors, (ii) swap end turns that connect in-slot conductors of adjacent paths in the same layers and swap the positions of the in-slot conductors, (iii) crisscross end turns that move first adjacent paths from a first layer to a second layer and moves second adjacent paths from the second layer to the first layer, and (iv) transition end turns that move adjacent paths from a third layer to a fourth layer without crisscrossing other end turns.

* * * * *